(12) United States Patent
Macauley et al.

(10) Patent No.: US 8,384,522 B2
(45) Date of Patent: Feb. 26, 2013

(54) RADIO FREQUENCY IDENTIFICATION TRIANGULATION SYSTEMS FOR COMMUNICATIONS PATCHING SYSTEMS AND RELATED METHODS OF DETERMINING PATCH CORD CONNECTIVITY INFORMATION

(75) Inventors: Daniel W. Macauley, Fishers, IN (US); Peter T. Tucker, Dallas, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1043 days.

(21) Appl. No.: 12/203,446

(22) Filed: Sep. 3, 2008

(65) Prior Publication Data
US 2010/0052856 A1   Mar. 4, 2010

(51) Int. Cl.
*H04Q 5/22* (2006.01)
*G05B 19/00* (2006.01)
*G05B 1/00* (2006.01)
*G08C 19/12* (2006.01)

(52) U.S. Cl. ............ 340/10.1; 340/13.26; 340/10.4; 340/10.41; 340/10.42; 340/146.2; 340/5.1

(58) Field of Classification Search .......... 340/572.1, 340/10.1–10.4
See application file for complete search history.

(56) References Cited

U.S. PATENT DOCUMENTS

| | | | |
|---|---|---|---|
| 5,627,544 A * | 5/1997 | Snodgrass et al. | 342/42 |
| 5,956,259 A * | 9/1999 | Hartsell et al. | 700/302 |
| 6,070,156 A * | 5/2000 | Hartsell, Jr. | 705/413 |
| 6,113,504 A * | 9/2000 | Kuesters | 473/353 |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,313,737 B1 * | 11/2001 | Freeze et al. | 340/10.1 |
| 6,330,307 B1 | 12/2001 | Bloch et al. | |
| 6,350,148 B1 | 2/2002 | Bartolutti et al. | |
| 6,424,710 B1 | 7/2002 | Bartolutti et al. | |
| 6,522,737 B1 | 2/2003 | Bartolutti et al. | |
| 6,688,910 B1 | 2/2004 | Macauley | |
| 6,784,802 B1 | 8/2004 | Stanescu | |
| 6,963,289 B2 * | 11/2005 | Aljadeff et al. | 340/8.1 |
| 6,968,994 B1 | 11/2005 | Smith | |
| 7,170,393 B2 * | 1/2007 | Martin | 340/10.1 |

(Continued)

FOREIGN PATENT DOCUMENTS

WO   WO 2006/009728 A2   1/2006
WO   WO 2006/063023 A1   6/2006

(Continued)

OTHER PUBLICATIONS

German Combined Search and Examination Report for GB0914432.0, dated Nov. 10, 2009.

*Primary Examiner* — Daniel Wu
*Assistant Examiner* — Muhammad Adnan
(74) *Attorney, Agent, or Firm* — Myers Bigel Sibley & Sajovec

(57) ABSTRACT

Methods of determining patch cord connectivity information include receiving, at each of a plurality of RFID readers, a signal from an RFID tag that is associated with a first patch cord and then, identifying the one of a plurality of connector ports that the first patch cord is connected to based at least in part on respective strengths of the signals received at each of the plurality of RFID readers. RFID triangulation systems and methods of calibrating such systems are also provided.

18 Claims, 11 Drawing Sheets

U.S. PATENT DOCUMENTS

| | | | |
|---|---|---|---|
| 7,199,712 B2 * | 4/2007 | Tafas et al. | 340/572.1 |
| 7,323,989 B2 * | 1/2008 | Allen | 340/572.1 |
| 7,323,991 B1 * | 1/2008 | Eckert et al. | 340/572.1 |
| 7,436,310 B2 * | 10/2008 | Flaster et al. | 340/572.8 |
| 7,468,669 B1 * | 12/2008 | Beck et al. | 340/572.1 |
| 7,577,444 B2 * | 8/2009 | Bird et al. | 455/456.2 |
| 7,605,707 B2 * | 10/2009 | German et al. | 340/572.8 |
| 7,686,229 B2 * | 3/2010 | Lyon et al. | 235/492 |
| 7,756,415 B2 * | 7/2010 | Huseth et al. | 396/429 |
| RE41,530 E * | 8/2010 | Wood, Jr. | 370/329 |
| 7,904,092 B2 * | 3/2011 | Hart et al. | 455/446 |
| 2002/0177490 A1 * | 11/2002 | Yong et al. | 473/353 |
| 2003/0030568 A1 * | 2/2003 | Lastinger et al. | 340/825.49 |
| 2003/0129992 A1 * | 7/2003 | Koorapaty et al. | 455/456 |
| 2005/0077353 A1 * | 4/2005 | Oishi et al. | 235/385 |
| 2006/0033609 A1 * | 2/2006 | Bridgelall | 340/10.42 |
| 2006/0148279 A1 | 7/2006 | German et al. | |
| 2006/0160396 A1 | 7/2006 | Macauley et al. | |
| 2006/0229928 A1 * | 10/2006 | Nix, Jr. | 705/9 |
| 2007/0073513 A1 * | 3/2007 | Posamentier | 702/150 |
| 2007/0221730 A1 * | 9/2007 | McReynolds et al. | 235/451 |
| 2007/0247284 A1 * | 10/2007 | Martin et al. | 340/10.1 |
| 2008/0039114 A1 * | 2/2008 | Phatak et al. | 455/456.1 |
| 2008/0070572 A1 * | 3/2008 | Shkedi | 455/435.1 |
| 2008/0180221 A1 * | 7/2008 | Tuttle | 340/10.2 |
| 2008/0238686 A1 * | 10/2008 | Tuttle | 340/572.7 |
| 2009/0280827 A1 * | 11/2009 | Michaud | 455/456.1 |

FOREIGN PATENT DOCUMENTS

| | | |
|---|---|---|
| WO | WO 2007/041153 A1 | 4/2007 |
| WO | WO 2007/070103 A1 | 6/2007 |
| WO | WO 2009/051647 A1 | 4/2009 |

* cited by examiner

RADIO FREQUENCY IDENTIFICATION TRIANGULATION SYSTEMS FOR COMMUNICATIONS PATCHING SYSTEMS AND RELATED METHODS OF DETERMINING PATCH CORD CONNECTIVITY INFORMATION

FIELD OF THE INVENTION

The present invention relates generally to communications patching systems and, more particularly, to communications patching systems that use radio frequency identification ("RFID") for tracking patching connections.

BACKGROUND

Many businesses have dedicated communications systems that enable computers, servers, printers, facsimile machines and the like to communicate with each other, through a private network, and with remote locations via a telecommunications service provider. In, for example, commercial office buildings, the dedicated communications system may be hard wired using communications cables that contain conductive wire. In such hard wired systems, individual connector ports such as modular wall jacks are mounted in offices throughout the building. Communications cables are run through, for example, the walls and/or ceiling of the building to electrically connect each connector port to network equipment (e.g., network servers) that are located in, for example, a telecommunications closet or computer room. Communications cables from external telecommunication service providers may also terminate within the computer room or telecommunications closet.

Communications patching systems are often used to interconnect the various communication cables within a computer room or telecommunications closet. These communications patching systems may facilitate terminating the cables in an organized fashion, and may also simplify the process for later making changes to the connections between communications cables. Typically, a communications patching system includes one or more mounting frames, usually in the form of equipment racks. Network equipment such as, for example, network servers and switches may be mounted on these mounting frames, as may one or more "patch panels." As is known to those of skill in the art, a "patch panel" refers to an interconnect device that includes a plurality of connector ports such as, for example, communications jacks or fiber optic couplers on at least one side thereof. Each connector port (e.g., a jack) is configured to receive a communications cable that is terminated with a mating connector (e.g., a plug). One or more communications cables may also be terminated into a reverse side of the patch panel (the communications wires of each cable can be terminated into individual contacts or couplers such as, for example, insulation displacement contacts that are often used to terminate the conductors of a twisted pair cable, or may be terminated using a connector port such as would be the case with an RJ-45-to-RJ-45 patch panel). Each connector port on the patch panel may provide communications paths between a communications cable that is plugged into the connector port and a respective one of the communications cables that is terminated into the reverse side of the patch panel. Communications patching systems are typically used to connect individual connector ports in offices throughout the building to, for example, network equipment in the computer room of the building.

FIG. 1 is a simplified example of one way in which a computer 26 in an office or other room 4 of a building may be connected to network equipment 52, 54 located in, for example, a computer room 2 of the building. As shown in FIG. 1, the computer 26 is connected by a patch cord 28 to a modular wall jack 22 that is mounted in a wall plate 24 in office 4. A communications cable 20 is routed from the back end of the modular wall jack 22 through, for example, the walls and/or ceiling of the building, to the computer room 2. As there will often be hundreds or thousands of wall jacks 22 within an office building, a large number of cables 20 are routed into the computer room 2.

A first equipment rack 10 is provided within the computer room 2. A plurality of patch panels 12 are mounted on the first equipment rack 10. Each patch panel 12 includes a plurality of connector ports 16. In FIG. 1, each connector port 16 comprises a modular RJ-45 jack that is configured to receive a modular RJ-45 plug connector. However, it will be appreciated that other types of patch panels may be used such as, for example, patch panels with optical fiber connector ports 16 (e.g., SC, ST, and LC ports) or patch panels with other types of twisted copper wire pair connector ports 16 (e.g., RJ-11 ports).

As shown in FIG. 1, each communications cable 20 that provides connectivity between the computer room 2 and the various offices 4 in the building is terminated onto the back end of one of the connector ports 16 of one of the patch panels 12 on equipment rack 10. A second equipment rack 30 is also provided in the computer room 2. A plurality of patch panels 12' that include connector ports 16' are mounted on the second equipment rack 30. A first set of patch cords 40 (only two exemplary patch cords 40 are illustrated in FIG. 1) are used to interconnect connector ports 16 on the patch panels 12 to respective ones of the connector ports 16' on the patch panels 12'. The first and second equipment racks 10, 30 may be located in close proximity to each other (e.g., side-by-side) to simplify the routing of the patch cords 40.

As is further shown in FIG. 1, network equipment such as, for example, one or more switches 52 and network routers and/or servers 54 ("network devices") are mounted on a third equipment rack 50. Each of the switches 52 may include a plurality of connector ports 53. A second set of patch cords 60 connect the connector ports 53 on the switches 52 to the back end of respective ones of the connector ports 16' on the patch panels 12'. As is also shown in FIG. 1, a third set of patch cords 64 may be used to interconnect other of the connector ports 53 on the switches 52 with connector ports 55 provided on the network devices 54. In order to simplify FIG. 1, only a single patch cord 60 and a single patch cord 64 are shown. Finally, one or more external communications lines 66 are connected to, for example, one or more of the network devices 54. In many instances, the communication lines 66 would terminate onto a patch panel and be connected to the network device 54 via a patch cord. For simplicity, the external communication line 66 is pictured as a cable/cord 66 in FIG. 1, which may be the actual external communication line or, alternatively, may be a patch cord that is connected to a patch panel connector port which the actual external communication line is terminated into.

The communications patching system of FIG. 1 may be used to connect each computer, printer, facsimile machine and the like 26 located throughout the building to local area network ("LAN") switches 52, the LAN switches 52 to network routers 54, and the network routers 54 to external communications lines 66, thereby establishing the physical connectivity required to give devices 26 access to both local and wide area networks. In the patching system of FIG. 1, connectivity changes are typically made by rearranging the patch cords 40 that interconnect the connector ports 16 on the patch panels 12 with respective of the connector ports 16' on the patch panels 12'.

The equipment configuration shown in FIG. 1, in which each wall jack 22 is connected to the network equipment 52, 54 through at least two patch panels 12, 12', is referred to as a "cross-connect" patching system. In another commonly used equipment configuration, which is typically referred to as "inter-connect" patching system, the communications path from each modular wall jack 22 to the network devices 54 typically passes through a single patch panel 12.

FIG. 2 depicts a simplified version of an inter-connect patching system that is used to connect a plurality of computers 126 (and other networked equipment) located in the rooms 104 throughout an office building to a plurality of network devices 154 that are located in a computer room 102 of the building. As shown in FIG. 2, a plurality of patch panels 112 are mounted on a first equipment rack 110. Each patch panel 112 includes a plurality of connector ports 116. A plurality of communications cables 120 are routed from wall jacks 122 in offices 104 into the computer room 102 and connected to the reverse side of the patch panels 112. The computers 126 are connected to respective of the modular wall jacks 122 by patch cords 128.

As is further shown in FIG. 2, network equipment such as, for example, one or more network devices 154, are mounted on a second equipment rack 150. One or more external communications lines 166 are connected (typically through one or more patch panels and patch cords) to one or more of the network devices 154. A plurality of switches 152 that include a plurality of connector ports 153 are also provided. The switches 152 may be connected to the network devices 154 using a first set of patch cords 164 (only one patch cord 164 is shown in FIG. 2). A second set of patch cords 160 (only one patch cord 160 is shown in FIG. 2) are used to interconnect the connector ports 116 on the patch panels 112 with respective of the connector ports 153 on the switches 152. In the patching system of FIG. 2, connectivity changes are typically made by rearranging the patch cords 160 that interconnect the connector ports 116 on the patch panels 112 with respective of the connector ports 153 on the switches 152.

The patch cords in a telecommunications closet may be rearranged quite often. The interconnections of the various patch cords in a telecommunications closet are typically logged in either a paper or computer-based log. However, technicians may neglect to update the log each and every time a change is made, and/or may make errors in logging changes. As such, paper- or computer-based logs may not be 100 percent accurate so that the technician cannot have full confidence from reading the log where each of the patch cords begins and ends. Accordingly, each time a technician needs to change a patch cord, the technician often manually traces that patch cord between two connector ports. To perform a manual trace, the technician locates one end of a patch cord and then manually follows the patch cord until he/she finds the opposite end of that patch cord.

Due to the large number of patch cords that are typically used at any one time and/or the cable routing mechanisms that are often used to keep the cable of each patch cord neatly routed, it may take a significant amount of time for a technician to manually trace a particular patch cord. Furthermore, manual tracing may not be completely accurate as technicians may accidentally switch from one patch cord to another during a manual trace. Such errors may result in misconnected communication cables which must be later identified and corrected. Thus, ensuring that the proper connections are made can be time-consuming, and the process is prone to errors in both the making of connections and in keeping records of the connections.

SUMMARY

According to certain embodiments of the present invention, methods of determining patch cord connectivity information are provided. Pursuant to these methods, a first signal is received from an RFID tag that is associated with a first patch cord at a first RFID antenna and a second signal is received from the RFID tag at a second RFID antenna. The specific connector port in the connector port array that the first patch cord is connected to may then be identified based at least in part on the respective strengths of the received first and second signals. These methods may further comprise receiving a third signal from the RFID tag at a third RFID antenna. In such embodiments, the identification of the one of the plurality of connector ports that the first patch cord is connected to may be based on the respective strengths of the received first, second and third signals.

In some embodiments of these methods, an excitation signal is transmitted to the RFID tag in order to cause the RFID tag to emit a transmitted signal. The first, second and third signals may be received versions of the transmitted signal that are received at the first, second and third RFID antennas, respectively. Thus, in these embodiments, each of the first, second and third RFID antennas may receive and process the same signal that is transmitted by the RFID tag. In other embodiments, a first excitation signal may be transmitted to the RFID tag in order to cause the RFID tag to emit a first transmitted signal, where the first signal is the version of the first transmitted signal that is received at the first RFID antenna. Likewise, a second excitation signal may be transmitted to the RFID tag in order to cause the RFID tag to emit a second transmitted signal, where the second signal is the version of the second transmitted signal that is received at the second RFID antenna, and a third excitation signal may be transmitted to the RFID tag in order to cause the RFID tag to emit a third transmitted signal, where the third signal is the version of the third transmitted signal that is received at the third RFID antenna. Thus, in these alternative embodiments, the first, second and third RFID antennas receive and process different signals that are transmitted by the RFID tag.

In some embodiments, the connector port that the first patch cord is connected to may be identified by comparing the respective strengths of the signals received at each of the RFID antennas to pre-stored signal strength data for each of the connector ports in order to identify a connector port that has pre-stored signal strength data that most closely matches the respective strengths of the signal received at each of the RFID antennas. If it is determined that the strength of the signals received at each of the RFID antennas does not match the pre-stored signal strength data within a predetermined margin of error, then an adjustment may be made to the measured received signal strengths, and these adjusted signal strengths may then be compared to the pre-stored signal strength data.

Pursuant to further embodiments of the present invention, methods of determining which connector port in a connector port array an RFID enabled patch cord is connected to are provided. Pursuant to these methods, one or more signals are transmitted from an RFID tag. A received version of at least one of the signals transmitted by the RFID tag is received at each of a plurality of RFID antennas. Triangulation is then performed using at least some of the received versions of the one or more signals transmitted by the RFID tag to identify a connector port in the connector port array that the RFID enabled patch cord is connected to.

Pursuant to still further embodiments of the present invention, systems for identifying which one of a plurality of connector ports a first patch cord is connected to are provided. These systems include first, second and third RFID antennas. The systems further include one or more devices that are configured to measure the strength of signals received at the first, second and third RFID antennas. The one or more devices may be one or more REID transceivers. The systems also include a controller that is configured to determine the location of an RFID tag that is associated with the first patch cord based at least in part on the measured strengths of the signals received at the first, second and third RFID antennas. The controller may also be configured to log patch cord interconnections with the connector ports. In some embodiments, the system may also include a database of information that includes, for each of the connector ports, an expected received signal strength for an RFID tag that is connected to the respective one of the connector ports.

Pursuant to still other embodiments of the present invention methods of calibrating a system for determining patch cord connectivity information for a connector port array are provided. Pursuant to these methods, an RFID-enabled patch cord is inserted into a first of the connector ports within the connector port array. An RFID tag that is on the RFID-enabled patch cord is then energized to cause the RFID tag to emit a signal that is received at each of a plurality of RFID antennas that are associated with the connector port array. The strength of the signal received at each of the RFID antennas is measured, and the measured signal strengths are stored as pre-stored signal strength data for the first of the connector ports in the connector port array. The above-described steps are then repeated for each of the connector ports in the connector port array in order to obtain pre-stored signal strength data for each of the connector ports in the connector port array.

DETAILED DESCRIPTION

Figure 1:
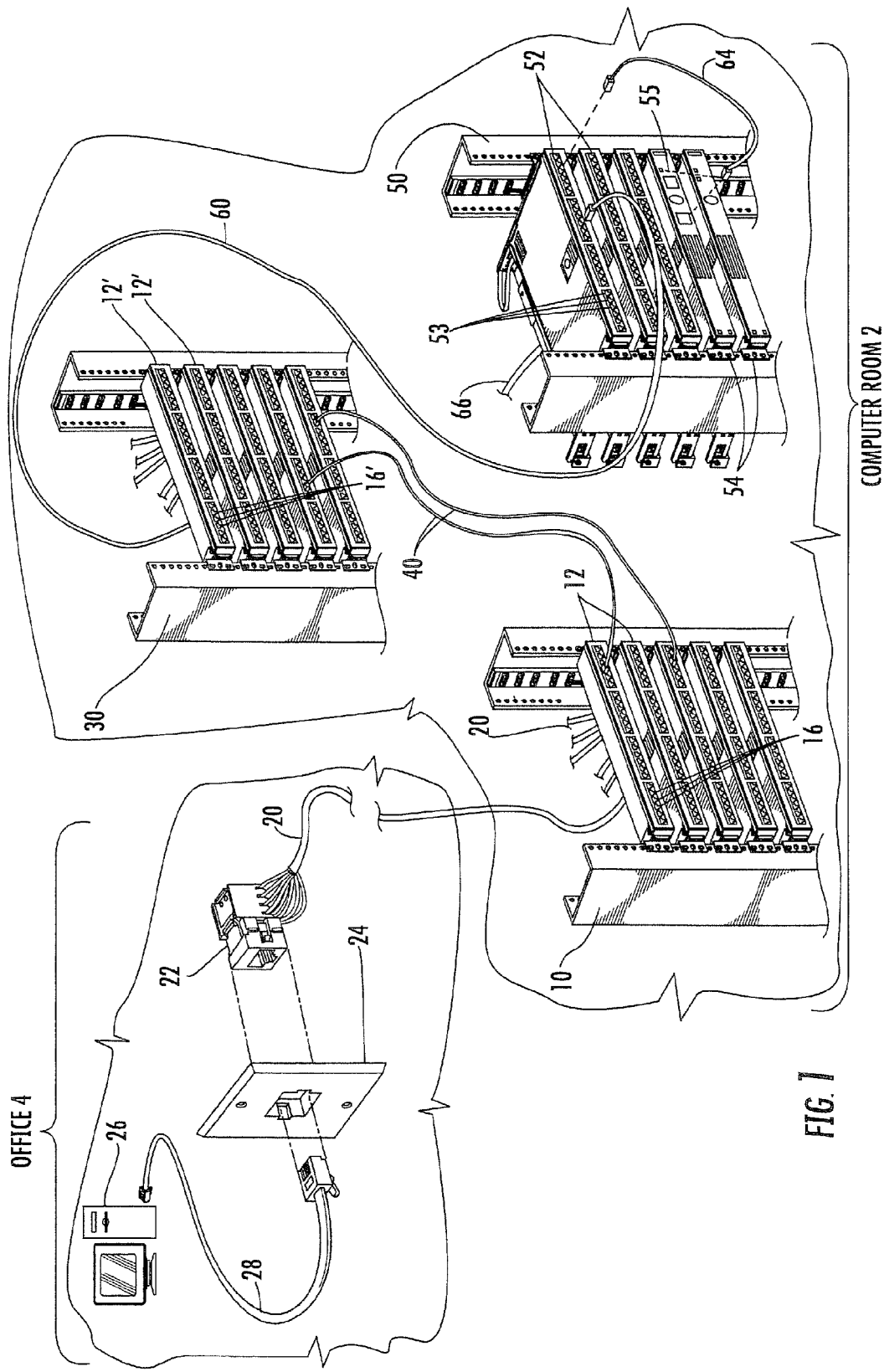
FIG. 1 is a perspective view of a simplified prior art cross-connect communications patching system.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

Communications patching systems are known in the art that automate the process of detecting and identifying the ends of patch cords used therein. For example, U.S. Pat. No. 6,222,908 describes a communications patching system in which each patch cord connector (e.g., plug) includes a unique identifier, and each connector port on the patch panels includes a sensor that reads the unique identifier on any patch cord connector inserted therein. Similarly, U.S. Pat. No. 6,784,802 describes a communications patching system for monitoring connectivity in a communications patching system that includes radio frequency identification ("RFID") transponders or "tags" on the ends of each patch cord and RFID sensors adjacent each connector port of the patch panels. In this system, the RFID tags on each patch cord have a unique identifier that differs from the RFID tags on all other patch cords, and this unique identifier is transmitted by the RFID tag. Each RFID sensor is capable of receiving the unique identifier transmitted by the REID tag on a patch cord that is inserted into the connector port associated with the REID sensor. If all of the patch panels in the system include RFID sensors, then the systems described in U.S. Pat. No. 6,784,802 may be used to automatically determine the connector ports on the patch panels that each patch cord is plugged into.

One limitation, however, of such existing systems for automatically tracking connectivity information in a communications patching system is that these systems generally require that both ends of the patch cords be plugged into the connector ports of "intelligent" patch panels (i.e., patch panels that have the capability to automatically identify the patch cords that are plugged into the connector ports on the patch panel). As such, the automated tracking capabilities of existing intelligent patch panels typically cannot be utilized in inter-connect communications patching systems, as in inter-connect systems, the patch cords connect a patch panel to a network switch or other piece of network equipment. While intelligent patch panels are commercially available, "intelligent"

switches that include the capability to automatically determine the patch cords that are plugged into the connector ports thereof are generally not available. As a result, even if intelligent patch panels are used in an inter-connect system, the system will be unable to automatically track full patch cord connectivity information, as connectivity information is not automatically gathered for the end of the patch cord that is inserted directly into the non-intelligent network equipment. This same problem may also arise in cross-connect systems which include, for example, some RFID-enabled patch panels and some non-RFID-enabled patch panels.

Pursuant to embodiments of the present invention, systems and methods are provided that use triangulation techniques to determine patch cord connectivity information in communications patching systems. The systems and methods according to embodiments of the present invention may be used on, for example, conventional patch panels, switches, or other network equipment that do not include automated connectivity tracking capabilities (i.e., on "non-intelligent" devices). Accordingly, the systems and methods of the present invention may facilitate automatically tracking connectivity information in inter-connect communication patching systems which include non-intelligent switches. The disclosed systems and methods may also allow customers to automatically track connectivity information without replacing existing non-intelligent patch panels, and may allow such automatic tracking in communications patching systems that include equipment (e.g., non-intelligent patch panels) provided by multiple different vendors.

In specific embodiments of the present invention, RFID technology is used to implement both the intelligent patching and triangulation aspects of the present invention. As is known to those of skill in the art, RFID refers to a class of applications in which items that are to be tracked are "tagged" with an RFID tag. An RFID tag is a specially designed electronic tag, which is typically implemented as the combination of a computer chip and an antenna, that is placed on, or embedded in, an object. These RFID tags work in conjunction with an RFID transceiver and an RFID antenna. An "RFID transceiver" refers to a class of circuit(s), chip(s) or device(s) that transmit a signal that may be used to (a) energize or "excite" an RFID tag and (b) receive and demodulate and/or decode information that is transmitted by the energized RFID tag. The RFID transceiver may comprise a single circuit, chip or device, or may comprise multiple circuits, chips and/or devices. A variety of RFID transceivers are commercially available such as, for example, the Philips HTRC 110 IC RFID transceiver. RFID antennas refer to a type of antenna that emits a field in response to receiving a signal from, for example, an RFID transceiver. The RFID antenna may also receive and pass to the RFID transceiver a signal that is transmitted from an excited RFID tag. Operation of the principles of radio frequency identification will now be described with reference to FIG. 3.

Figure 3:
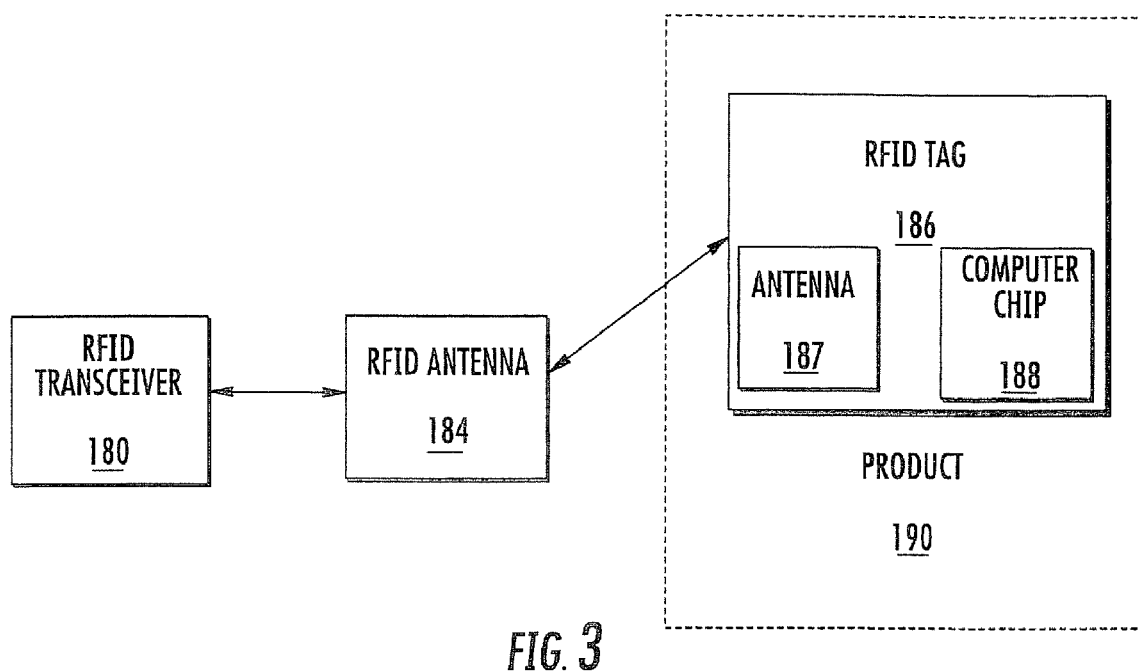
FIG. 3 is a schematic diagram illustrating operation of a radio frequency identification system.

As shown in FIG. 3, an RFID transceiver 180 sends a signal to an RFID antenna 184. The RFID antenna 184 broadcasts the signal as a radio frequency ("RF") broadcast signal. This RF broadcast signal may comprise, for example, an alternating current signal of fixed amplitude and frequency, with the frequency matching the resonance frequency of the RFID tags that are to be read. As is also shown in FIG. 3, an RFID tag 186 is mounted or embedded in a product 190. The RFID tag 186 includes an antenna 187 and a computer chip 188 in which a unique identifier is stored. The antenna 187 receives the RF broadcast signal. This received RF broadcast signal energizes the RFID tag 186, causing the RFID tag 186 to transmit information back to the RFID transceiver 180 by altering the load placed by the RFID tag 186 on the RF broadcast signal that is transmitted by the RFID antenna 184. This variation in load causes the amplitude of the RF broadcast signal to vary over time. The information transmitted by the RFID tag 186 to the REID transceiver 180 includes the unique identifier that is stored in the memory of the RFID tag 186 (and perhaps other information as well). The RFID transceiver 180 detects these variations in the amplitude of the RF broadcast signal, demodulates them, and converts them from an analog signal to a digital signal. A microcontroller (which may, for example, be embedded within the RFID transceiver 180 or which may be a separate controller) may then determine the unique identifier associated with the RFID tag 186 from this digital signal. In this manner, the RFID system can identify and track each RFID tagged product 190 that comes within a specified range of the RFID antenna 184.

RFID techniques may also be used to identify which specific patch cords are plugged into the connector ports of patch panels or other equipment such as, for example, switches that are part of a communications patching system. In order to accomplish this, an array of RFID antennas may be provided such that, for example, each connector port may have its own associated RFID antenna. Each RFID antenna may be intentionally designed to be a low efficiency antenna that emits a field that covers only a very small area so that the REID antenna associated with a first connector port will not energize RFID tags on patch cords inserted into other connector ports. One or more RFID transceivers are also provided.

Figure 4:
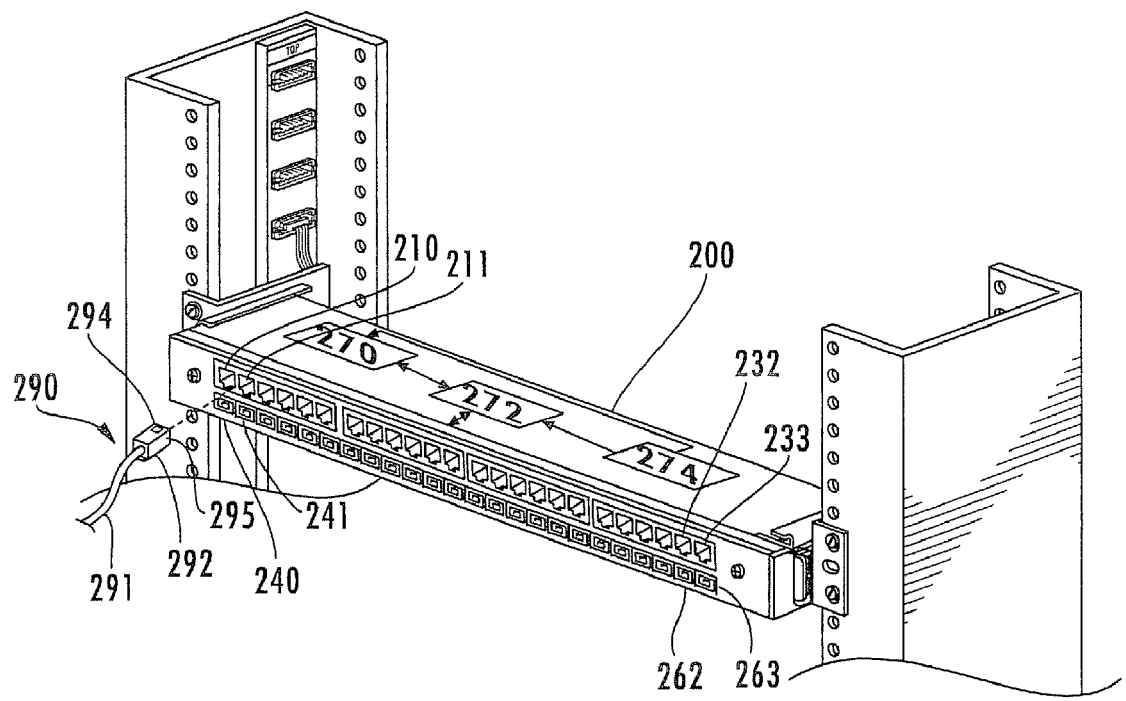
FIG. 4 is a perspective view of an intelligent patch panel that may be used in communications patching system according to embodiments of the present invention.

FIG. 4 is a perspective view of an intelligent patch panel 200 and an intelligent patch cord 290 that may be used in conjunction with the triangulation systems according to embodiments of the present invention. As shown in FIG. 4, the intelligent patch cord includes a cable 291. A connector 292 is terminated on each end of the cable 291 (only one end of patch cord 290 is shown in FIG. 4). In the depicted embodiment, the cable 291 contains four twisted wire pairs, and the connectors 292 comprise RJ-45 plug connectors. However, it will be appreciated that the present invention may also be used with other types of cables and connectors including, without limitation, fiber optic cables and connectors and other types of copper twisted pair cables and connectors (e.g., RJ-11 style, 25-pair, shielded cables and connectors, etc.). An RFID tag 294 is embedded in each of the connectors 292. As discussed above with respect to FIG. 3, each RFID tag 294 may include an antenna and a computer chip. The computer chip may include a memory that stores at least one identifier 295. Typically, the identifier 295 stored in the memories of the RFID tags 294 included on the two connectors of a particular patch cord will be identical, but this identifier 295 will be different than the identifiers 295 stored in the memories of the RFID tags 294 included on all of the other patch cords 290 that may be used in the communications patching system.

As is also shown in FIG. 4, the intelligent patch panel 200 includes a plurality of connector ports 210-233, a plurality of RFID antennas 240-263, an RFID transceiver 270, a switching circuit 272 and a controller 274. In order to simplify FIG. 4, the RFID transceiver 270, the switching circuit 272 and the a controller 274 are illustrated schematically as functional blocks. These components may be implemented in a variety of ways such as, for example, in the manner described in co-pending U.S. patent application Ser. No. 11/871,448, filed Oct. 12, 2007, the entire contents of which are incorporated by reference herein. Each of the RFID antennas 240-263 are located at or adjacent to a respective one of the connector ports 210-233. While in the depicted embodiment each RFID antenna 240-263 is located directly below its corresponding connector port 210-233, it will be appreciated that, in other embodiments, the RFID antennas 240-263 may be located, for example, above, to one side of, behind or below the aperture of their corresponding connector ports 210-233.

The RFID transceiver 270 may be used to sequentially activate each REID antenna 240-263. Each of the RFID antennas 240-263 may be designed to have a very small emission field such that the signal it transmits will only be received by the RFID tags 294 on intelligent patch cords 290 that are inserted into the connector port that is located directly above the RFID antenna, and will not be received by the RFID tags 294 on intelligent patch cords 290 that are inserted into any of the other connector ports on the patch panel 200. As such, when a particular RFID antenna (e.g., RFID antenna 240) is activated, the RFID transceiver 270 can, based on the signal (if any) received by RFID antenna 240, determine the unique identifier 295 that is stored in the memory of any RFID tag 294 that is mounted on an intelligent patch cord 290 that is plugged into the respective one of the connector ports (connector port 210) that is associated with RFID antenna 240.

The controller 274 may be implemented, for example, using a printed circuit board mountable microcontroller. The controller 274 may, in some embodiments, control the RFID transceiver 270 by, for example, providing control signals that control when the RFID transceiver 270 transmits signals. The controller 274 may also, in some embodiments, control the switching circuit 272 by, for example, providing control signals that control the switching circuit 272 to enable a signal path between the RFID transceiver 270 and a particular one of the RFID antennas 240-263 at a time. By using the controller 274 to control the RFID transceiver 270 to sequentially activate all of the RFID antennas 240-263, the patch cord connectivity for the patch panel 200 may be determined (i.e., for each connector port 210-233, the unique identifier 295 of any intelligent patch cord 290 that is plugged into the connector port is determined). The controller 274 may be connected to a database or other storage system (not shown in FIG. 4) that may be used to store the patch cord connection information that is tracked using the RFID capabilities of the patch panel 200. The controller 274 may also be coupled to a user interface (not shown in FIG. 4) which may allow a system operator to make queries and receive information regarding the current (or historical) patch cord connections to the patch panel 200.

While FIG. 4 illustrates one exemplary intelligent patch panel 200 that may be used in communications patching systems according to embodiments of the present invention, it will be appreciated that other intelligent patch panels may be used including, for example, the intelligent patch panels disclosed in U.S. patent application Ser. No. 11/605,806 filed on Nov. 29, 2006, the contents of which is incorporated by reference herein as if set forth in its entirety.

Figure 5:
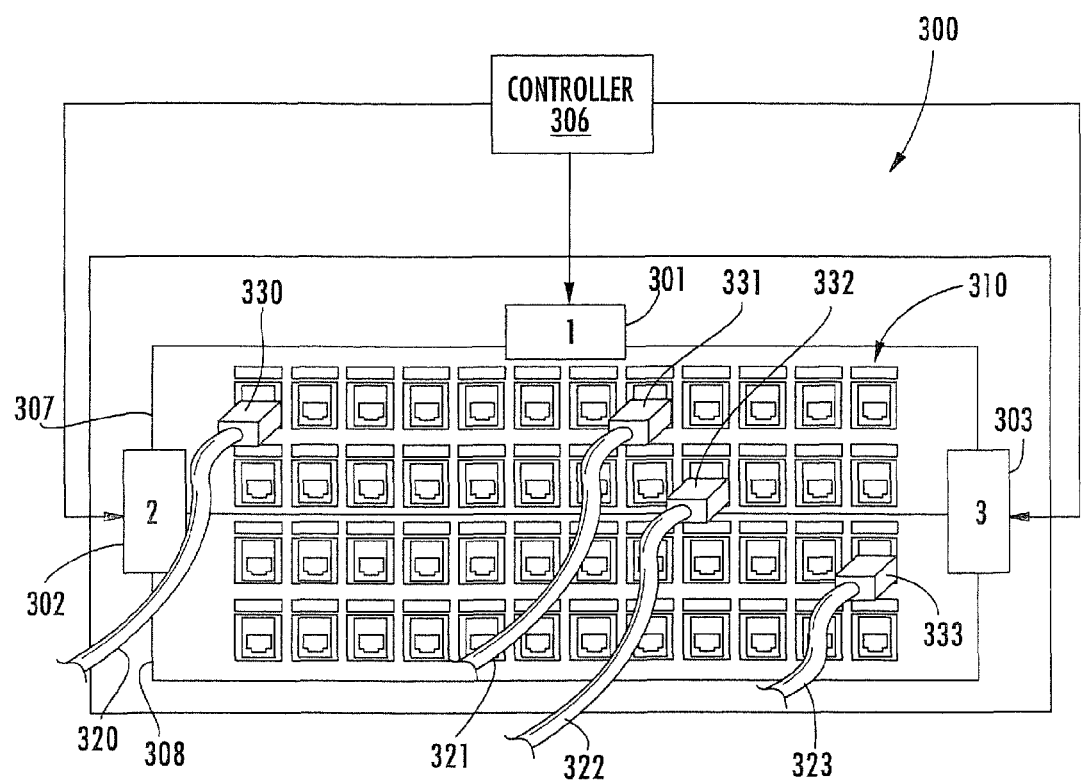
FIG. 5 is a front view of a triangulation system according to embodiments of the present invention that is installed on a pair of network switches.

FIG. 5 depicts an RFID triangulation system 300 according to certain embodiments of the present invention. The triangulation system 300 may be used to determine patch cord connectivity information with respect to a connector port array 310 (or a portion thereof) of, for example, a non-intelligent patch panel or network switch. The patch cord connectivity information that may be determined may comprise, for example, the unique identifier that is associated with each patch cord that is plugged into a respective one of the connector ports in the connector port array 310.

The RFID triangulation system 300 includes three RFID readers 301-303 and a controller 306. Herein, an "RFID reader" refers to a system that is capable of reading information transmitted by an RFID tag. An RFID reader will typically include both an RFID transceiver and an RFID antenna. In some embodiments, a single RFID transceiver may be shared by multiple RFID readers, while in other embodiments each RFID reader may include its own RFID transceiver. In the particular embodiment depicted in FIG. 5, each RFID reader 301-303 includes an RFID transceiver 304 and an RFID antenna 305. In other embodiments, schematic boxes 301-303 of FIG. 5 may each comprise an RFID antenna, and a single, switch, RFID transceiver could be located elsewhere that is used with all three RFID antennas 301-303.

In the example system depicted in FIG. 5, the connector port array 310 comprises the connector ports on two 24-connector port network switches 307, 308. Thus, the connector port array 310 includes a total of forty-eight connector ports. For purposes of explanation, in FIG. 5 intelligent RFID-tagged patch cords 320-323 are plugged into four of those connector ports (the connector ports that receive patch cords 320-323 are labelled 330-333, respectively, in FIG. 5). The RFID readers 301-303 may be arranged so that each of the RFID readers 301-303 can detect an RFID-tagged patch cord that is plugged into any of the forty-eight connector ports in the connector port array 310. Typically, the RFID readers 301-303 will be located about the periphery of the connector port array 310, although in some embodiments one or more of the RFID readers 301-303 could fall within the connector port array 310. In some embodiments, three RFID readers 301-303 are used, although it will be appreciated that in other embodiments, more or fewer than three RFID readers may be employed.

As with the RFID transceiver 270 discussed above with respect to FIG. 4, the RFID transceiver 305 of each of the RFID readers 301-303 has the ability to generate a waveform that is radiated from the RFID reader's RFID antenna 304 so as to energize any RFID tags that are in the emission field of the RFID antenna 304. Each RFID transceiver 305 likewise has the ability to demodulate the data stream received from any energized RFID tag. In addition to these capabilities, each RFID transceiver 305 has the ability to measure the strength of the signal it receives from an RFID tag. This signal strength measurement may then be used to estimate a distance between the RFID tag being read and the RFID antenna 304 that is coupled to the RFID transceiver 305.

It will be appreciated that the strength of the signals received at each RFID reader may be measured in a variety of different ways. By way of example, in some embodiments, the power of the received signal may be measured. In other embodiments, a voltage associated with the received signal may be measured. Other signal strength parameters may be used. Thus, it will be appreciated that the present invention is independent of the type of signal strength measurement used.

Figure 6:
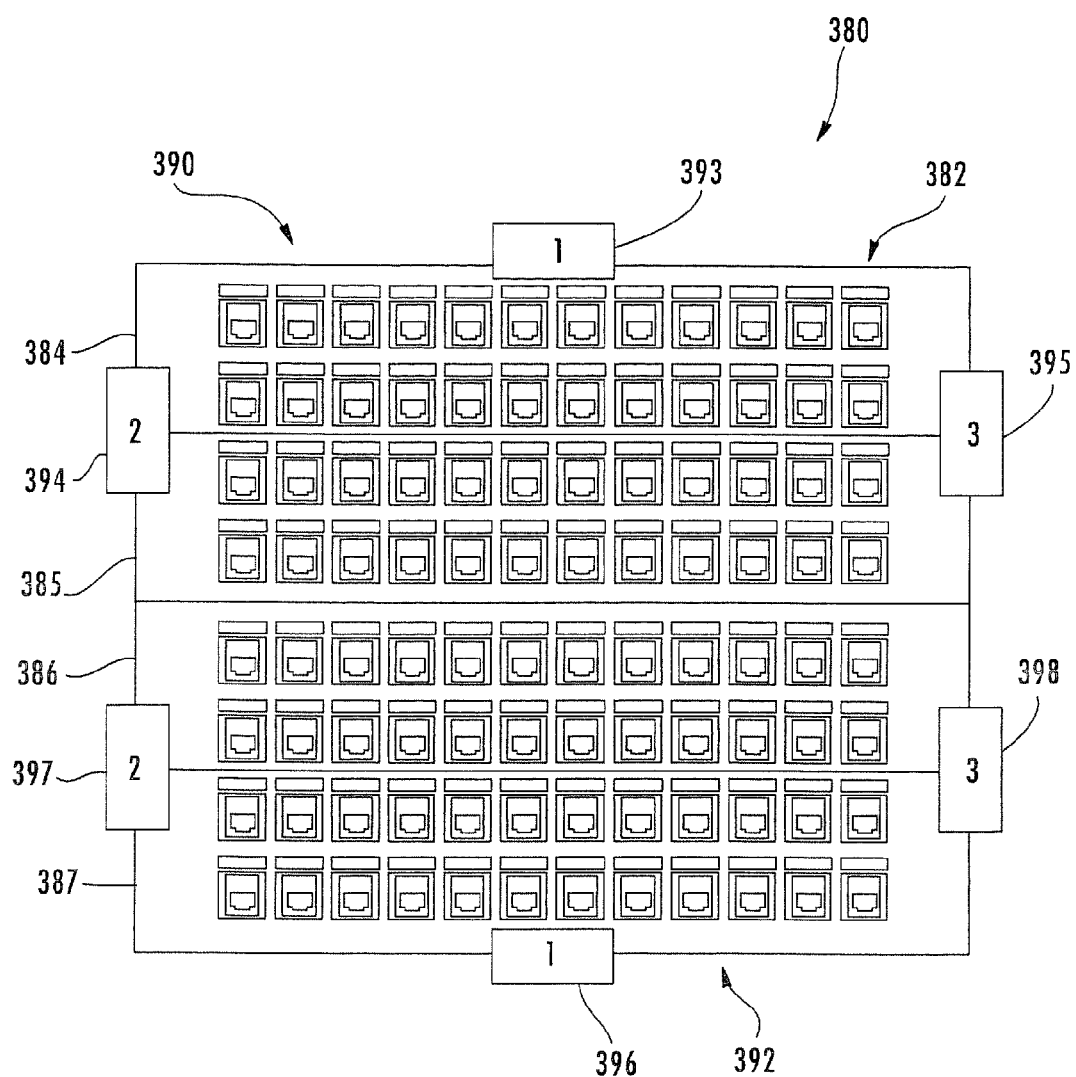
FIG. 6 is a front view of a triangulation system according to further embodiments of the present invention that includes multiple detection zones.

In some instances, the connector port array 310 may extend across an area that exceeds the emission field of the RFID antennas 304 of the RFID readers 301-303. When this occurs, the connector port array 310 may be divided into a plurality of blocks of connector ports, referred to herein as "detection zones", and the RFID readers 301-303 would be arranged, for example, about the periphery of one of the detection zones. The size of the detection zones is selected so that the RFID antenna 304 on each RFID reader 301-303 associated with a detection zone can read the RFID tag on any intelligent patch cord that is inserted in a connector port that is included within the detection zone. By way of example, FIG. 6 depicts an RFID triangulation system 380 that is deployed on a connector port array 382 which spans the connector ports on four 24-connector port network switches 384-387. As shown in FIG. 6, the connector port array is divided into a first detection zone 390 and a second detection zone 392. A first set of RFID readers 393-395 are located about the periphery of the first detection zone 390, and a second set of RFID readers 396-398 are located about the periphery of the second detection zone 392.

Figure 6A:
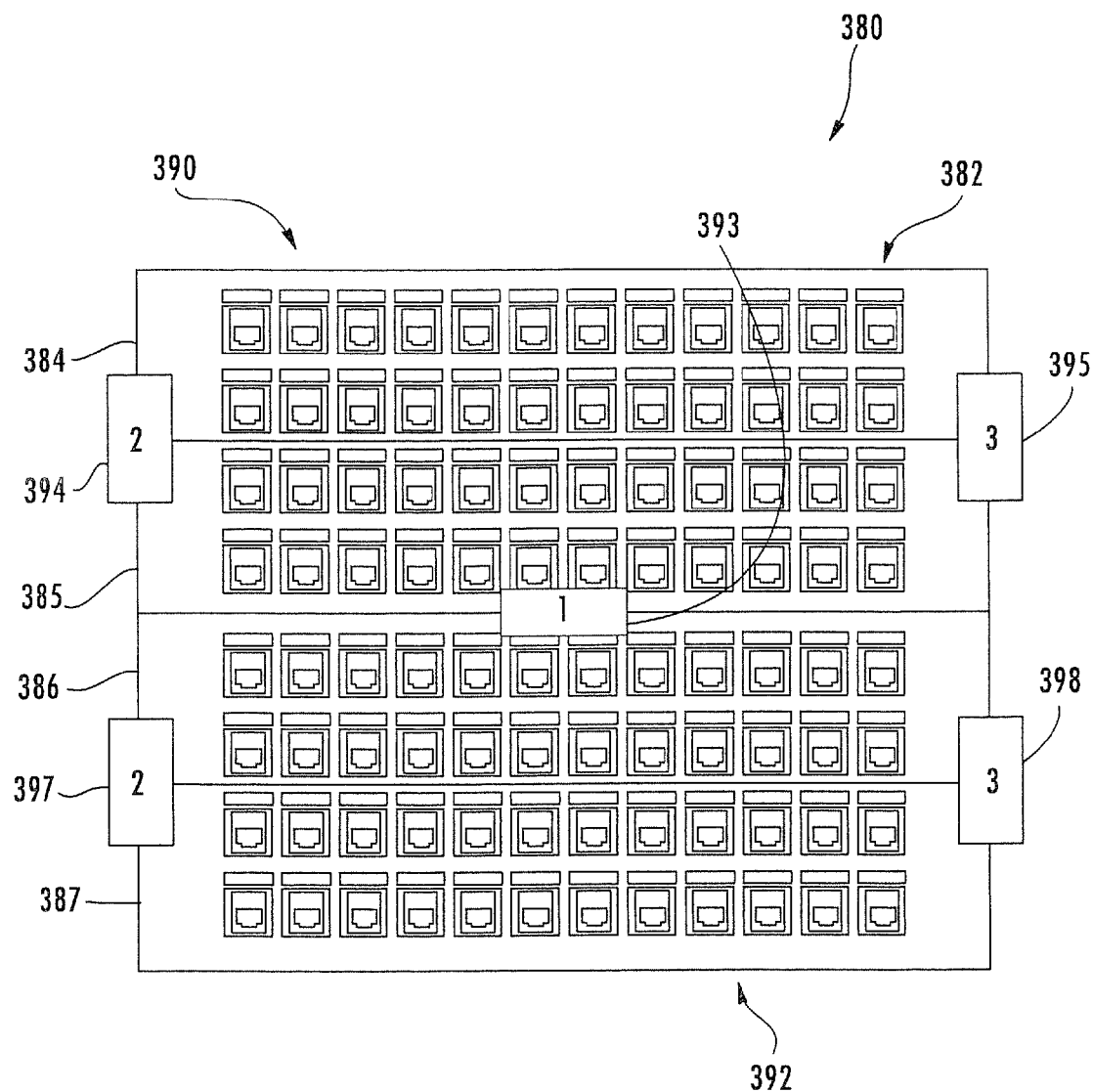
FIG. 6A is a front view of a triangulation system according to still further embodiments of the present invention that includes multiple detection zones.

Pursuant to further embodiments of the present invention, an RFID reader may be shared between two adjacent detection zones. FIG. 6A illustrates such an embodiment. As shown in FIG. 6A, one such implementation of this concept would be to modify the system of FIG. 6 by moving RFID reader 393 to a location adjacent both the first and second detection zones. In that manner, RFID reader 393 may be used as the first RFID reader for both the first and second detection zones, and RFID reader 396 may therefore be omitted. Such sharing of RFID readers between multiple detection zones may serve to reduce the overall cost of the system.

Methods by which the triangulation system 300 of FIG. 5 may be used to determine the patch cord connectivity within the connector port array 310 will now be described. Periodically, the controller 306 sequentially activates each of the stand-alone RFID readers 301-303 to identify the unique identifier of each intelligent patch cord that is currently plugged into one of the connector ports within the detection zone. As will be discussed in greater detail below, each RFID reader 301-303 may use an arbitration procedure to sequentially obtain these unique identifiers. For each intelligent patch cord that is identified as being present within the detection zone, the RFID readers 301-303 further determine the strength of the signal received from the RFID tag on each identified intelligent patch cord at each RFID reader 301-303. These signal strength measurements may be obtained for each identified patch cord each time the controller 306 sequentially activates the RFID readers 301-303 to update the patch cord connectivity information or, alternatively, may only be taken for any patch cords that are determined to have been placed within the detection zone (i.e., plugged into a connector port) since the last time the controller 306 sequentially activated the RFID readers 301-303.

Once measurements have been obtained of the strength of the signal received from each identified REID-tagged patch cord at each of the RFID readers 301-303, the controller 306 compares, for each identified RFID-tagged patch cord, the received signal strength information obtained by each of the RFID readers to stored calibration data for each of the connector ports in the detection zone. The stored calibration data may comprise a database that includes, for each of the connector ports in the connector port array 310, the expected values of the strength of a signal that would be received at each of the RFID readers 301-303 from an RFID-tagged patch cord that is plugged into the connector port. The controller 306 compares the measured received signal strengths at each RFID reader 301-303 of a signal emitted by a particular RFID-tagged patch cord to the calibration data to identify the connector port having calibration data that most closely matches the measured received signal strength data. The connector port so identified is determined to be the connector port which has the patch cord containing the RFID tag at issue connected to it. In this manner, the triangulation system 300 may be used to automatically obtain connectivity information for all of the connector ports in the detection zone. The controller 306 may also identify as part of this process any RFID tags that were previously present within the detection zone, but which are no longer present (indicating that the patch cords corresponding to such tags are no longer connected with any of the connector ports in the connector port array 310).

As will be appreciated by those of skill in the art in light of the present disclosure, a wide variety of algorithms and/or techniques may be used to determine the connector port calibration data that most closely corresponds to the actual measured signal strength data. In some embodiments of the present invention, the calibration data may comprise three data points, which correspond to the expected received signal strength at each of the three RFID readers of the signal emitted by the RFID tag on a patch cord that is plugged into that connector port. The measured data would likewise comprise three data points representing the actual measured signal strengths at each RFID reader of a signal transmitted by a particular RFID tag. In some embodiments of the present invention, a least mean squares approach may be used to identify the connector port having calibration data that most closely matches the measured signal strength data. Under this approach, the connector port having the smallest sum of the squares of the differences between the measured data and the calibration data is identified as the connector port that includes the RFID tag at issue. However, it will be appreciated that numerous other techniques may likewise be used to identify the connector port that is considered to have calibration data that most closely corresponds to the actual measured data.

As discussed above, a calibration procedure may be performed to obtain, for each of the RFID readers 301-303, an expected value of the strength of a signal that would be received at the RFID reader from an RFID-tagged patch cord that is connected with each of the connector ports in the connector port array 310. Thus, in the particular example of FIG. 5, this calibration procedure is used to collect a total of one hundred and forty-four (144) data points, which represent the expected received signal strength of a signal emitted by an RFID tag plugged into each of the forty-eight connector ports in the array 310 at the RFID antenna 304 of each of the three RFID readers 301-303. This calibration procedure may be performed at the time that the triangulation system 300 is initially installed. This calibration procedure may be implemented, for example, as follows.

First, an RFID-tagged patch cord that has a preset "calibration" identifier is placed in a first of the forty-eight connector ports (i.e., connector port 330) in connector port array 310. Using, for example, a calibration software program, a technician would identify the connector port that received the RFID-tagged patch cord (connector port 330 in this example) and initiate the calibration test for that connector port. As part of this calibration test, the calibration software program would sequentially activate the RFID antenna 304 on each of the RFID readers 301-303 in order to (1) excite the RFID tag on the RFID-tagged patch cord plugged into connector port 330 and (2) measure a received signal strength at the RFID antenna 304 in question of the signal received from the excited RFID tag. The measured received signal strength at each of the three RFID antennas 304 would then be stored in a database as the expected received signal strength from an RFID tag on an RFID-tagged patch cord plugged into connector port 330 at RFID readers 301, 302 and 303, respectively. Once the calibration software indicates that the connector port in question (i.e., connector port 330) has been calibrated, the technician moves the RFID-tagged patch cord to another of the connector ports in connector port array 310 and repeats the above process. This process continues until all forty-eight connector ports in the connector port array 310 have been calibrated.

As noted above, the controller 306 may perform a variety of functions including, for example, sequentially activating each RFID reader 301-303, controlling any switching circuit that may be included in the system (e.g., to share a single RFID transceiver across multiple of the RFID readers 301-303), storing the calibration data obtained during calibration of the triangulation system 300, performing the comparisons between the calibration data and measured data to determine patch cord connectivity, etc. It will be appreciated that the controller 306 in FIG. 5 may comprise a single controller or may comprise multiple processors, microcontrollers, computers and associated memories that collectively may be used to perform the various functions that the controller 306 may perform. By way of example, in some embodiments of the present invention, the controller 306 may be implemented as a microcontroller that may be mounted on or adjacent to the connector port array 310 and a remote system manager. This microcontroller may be hard-wired to each of the RFID readers 301-303 and may send control signals to the RFID readers for sequentially activating and deactivating the RFID readers 301-303. The microcontroller may also collect data forwarded by the RFID readers 301-303, such as unique identifiers and measured signal strength data. The remote system manager may comprise, for example, a central management software program running on a stand-alone control computer or other processing device. The system manager portion of the controller 306 may, for example, store the calibration data and perform the comparisons between the calibration data and measured signal strength data to determine patch cord connectivity. The system manager may be connected to the microcontroller directly via, for example, an Ethernet connection or indirectly via, for example, a rack controller that manages the equipment on the rack on which the triangulation system, 300 is used. Thus, it will be understood that the controller 306 in FIG. 5 represents one or more processors and/or associated memories that together may carry out the functionality attributed to controller 306.

In some embodiments of the present invention, the controller 306 may be configured to selectively apply an "adjustment" factor to account for differences in the resonance tuning of the RFID tag that was used during the calibration procedure and the resonance tuning(s) of the RFID tag(s) that are plugged into the connector ports of array 310 during actual use. This may be necessary, for example, because poorly tuned RFID tags will typically generate weaker signals than do properly tuned RFID tags. Thus, when a poorly tuned RFID tag is inserted into a connector port, the measured signal strengths may not match well with any of the calibrated signal strength data. The adjustment factor may be implemented in a variety of ways. For example, when the measured signal strengths do not match well with any of the calibrated signal strength data, the controller 306 may further determine if a close match would be provided if the signal strength measurement at each of the RFID readers 301-303 were increased by the same amount.

Figure 7:
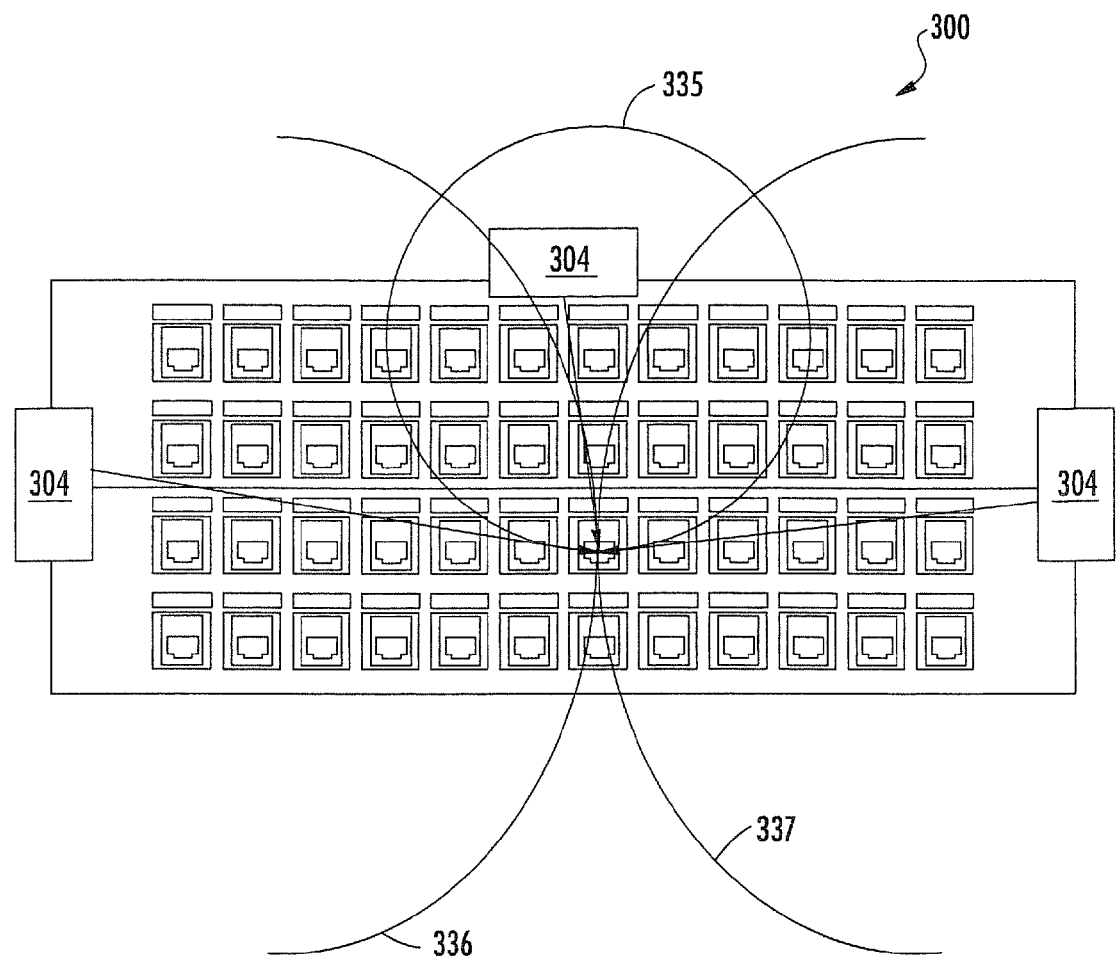
FIG. 7 is a front view of portions of the triangulation system and network switches of FIG. 5 that illustrates how triangulation techniques may be used to identify patch cord connectivity according to embodiments of the present invention.

FIG. 7 illustrates how the triangulation system 300 may operate to determine the specific connector port in the connector port array 310 that an RFID-tagged patch cord is plugged into. Assuming that uniformly radiating RFID antennas 304 and uniformly emitting RFID tags are used, the signal strength of a signal received by the RFID antennas 304 at each of the RFID readers 301-303 will vary inversely proportionally to the distance between each RFID antenna 304 and the emitting RFID tag. As such, when one of the RFID antennas 304 receives a signal of a particular strength, the signal strength corresponds to a specific distance that the emitting RFID tag is from the receiving RFID antenna 304. Thus, the received signal strength of a signal emitted by a particular RFID tag at each of the RFID antennas 304 may define a circle where the RFID tag may be located, wherein the radius of the circle is the distance from the RFID antenna 304 that corresponds to the measured received signal strength. The measured signal strength at each RFID antenna 304 thus defines a corresponding circle, which are depicted graphically in FIG. 7 as the circles (or relevant portions thereof) labelled 335-337. As shown in FIG. 7, when at least three RFID antennas 304 are used, the three circles 335-337 should intersect (or come close to intersecting) at one, and only one, location, that corresponds to the location of the emitting RFID tag. Thus, by using the signal strength measurements to estimate the distance between the emitting RFID tag and each of the RFID antennas 304, triangulation techniques may be used to determine the specific connector port in the connector port array 310 that a particular RFID-tagged patch cord is plugged into. Herein, the term "triangulation" refers to techniques where the location of a transmitter is identified based on characteristics of signals (e.g., received signal strengths) that are received from the transmitter at three or more different locations.

Typically, a number of RFID-enabled patch cords will be plugged into respective of the connector ports in the connector port array 310. As such, when one of the RFID readers 301-303 transmits a signal, the RFID tag on each of these patch cords will be excited. If multiple RFID tags are transmitting at the same time, the transmitted signals may interfere with each other (making it difficult or impossible to read the unique identifier associated with each RFID tag) and/or may make it difficult to determine the strength of the signal received from each RFID tag. Accordingly, pursuant to embodiments of the present invention, arbitration techniques are provided that may be used to cause the RFID tags within the field of the emitting RFID antenna to sequentially transmit to avoid such interference.

In some embodiments of the present invention, the above-described arbitration capability may be provided by using specialized RFID tags that support an arbitration procedure. The arbitration procedure can, for example, provide a method ensuring that only one RFID tag in the field of emission transmits information at a time and/or provide a way of obtaining the unique identification codes even when multiple RFID tags transmit information simultaneously. In some embodiments, each of the RFID readers 301-303 may use the specified arbitration procedure to first identify all of the RFID tags that are present within the field of the RFID reader 301-303 at a particular time, and the RFID readers 301-303 may then sequentially excite each identified RFID tag in turn to measure the received signal strengths.

For example, in some embodiments of the present invention, RFID tags such as Philips' Hi-Tag S series of RFID tags may be used. These RFID tags are designed to automatically perform an arbitration procedure when multiple RFID tags are excited at the same time by an RFID reader. Shortly after antenna power up, the RFID transceiver on the emitting REID reader issues a command that takes the RFID tags out of transponder talk first mode. The RFID transceiver then issues a command that causes each RFID tag to transmit its unique identification code at a well defined rate, such that each RFID tag transmits each bit of its identification code at the same time that the other RFID tags are transmitting the corresponding bit of their identification codes. As noted above, the identification code is programmed into each RFID tag, and is unique for each RFID-enabled patch cord. At some point, the identification bits being transmitted by the multiple RFID tags will not all match. This will be recognized by the RFID transceiver as a "collision," and the RFID transceiver will then transmit an instruction telling only the RFID tags that were transmitting, for example, a "1" when the collision occurred to continue sending the remainder of their identification bits. Each time a subsequent collision occurs, the RFID transceiver transmits another instruction that commands only the RFID tags that were transmitting, for example, a "1" to continue transmitting. This process continues until only a single RFID tag is transmitting and that tag has transmitted its full unique identification code. The RFID transceiver then returns to a previous branch point (i.e., a point where an instruction was transmitted) and takes a different path (i.e., if the previous instruction commanded only the RFID tags transmitting a "1" to continue transmitting, then the "different path" would be an instruction commanding only the RFID tags transmitting a "0" to continue transmitting) to obtain another unique identification code. This process continues until the RFID transceiver has a complete list of the unique identification codes of each excited RFID tag.

As another example, arbitration may be accomplished by using RFID tags that include a "sleep" capability. When these RFID tags receive a "sleep" instruction, they will no longer transmit when excited by an RFID antenna until such time as the RFID tag receives another command canceling the "sleep" mode. Each connector port in the connector port array 310 may include a sensor (e.g., an infrared transmitter and detector on opposite sides of the port aperture) that allows the connector port to determine when a patch cord is plugged into the connector port. Each time the system senses that a patch cord has been plugged into one of the connector ports in the array 310, the RFID tag on the patch cord may be read and the RFID reader may then issue a command that places the RFID tag at issue into a sleep mode. In this manner, all but one of the RFID tags will be in the sleep mode at any given time, and hence interference between transmitting RFID tags may be avoided.

Figure 2:
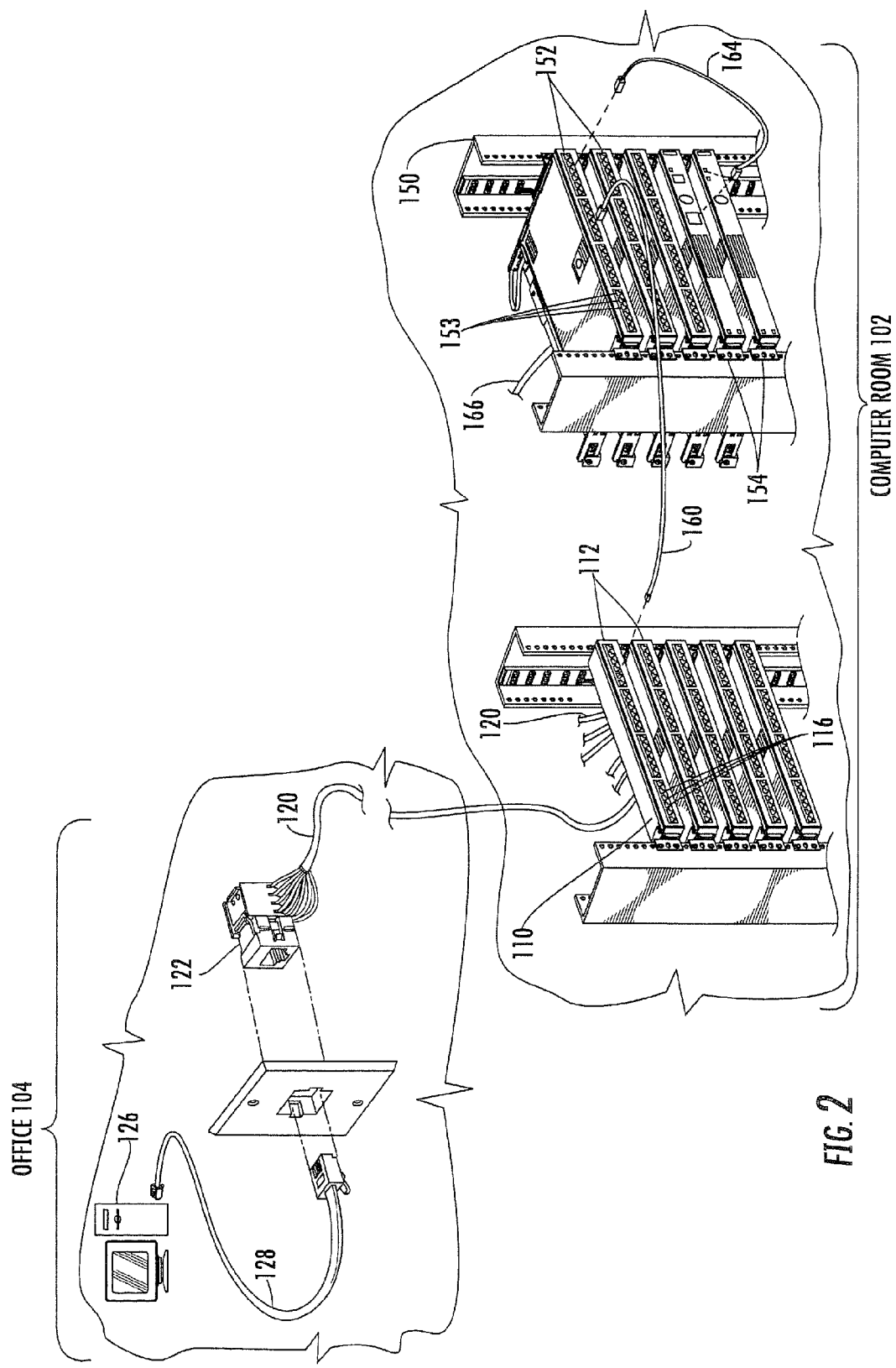
FIG. 2 is a perspective view of a simplified prior art inter-connect communications patching system.
Figure 8:
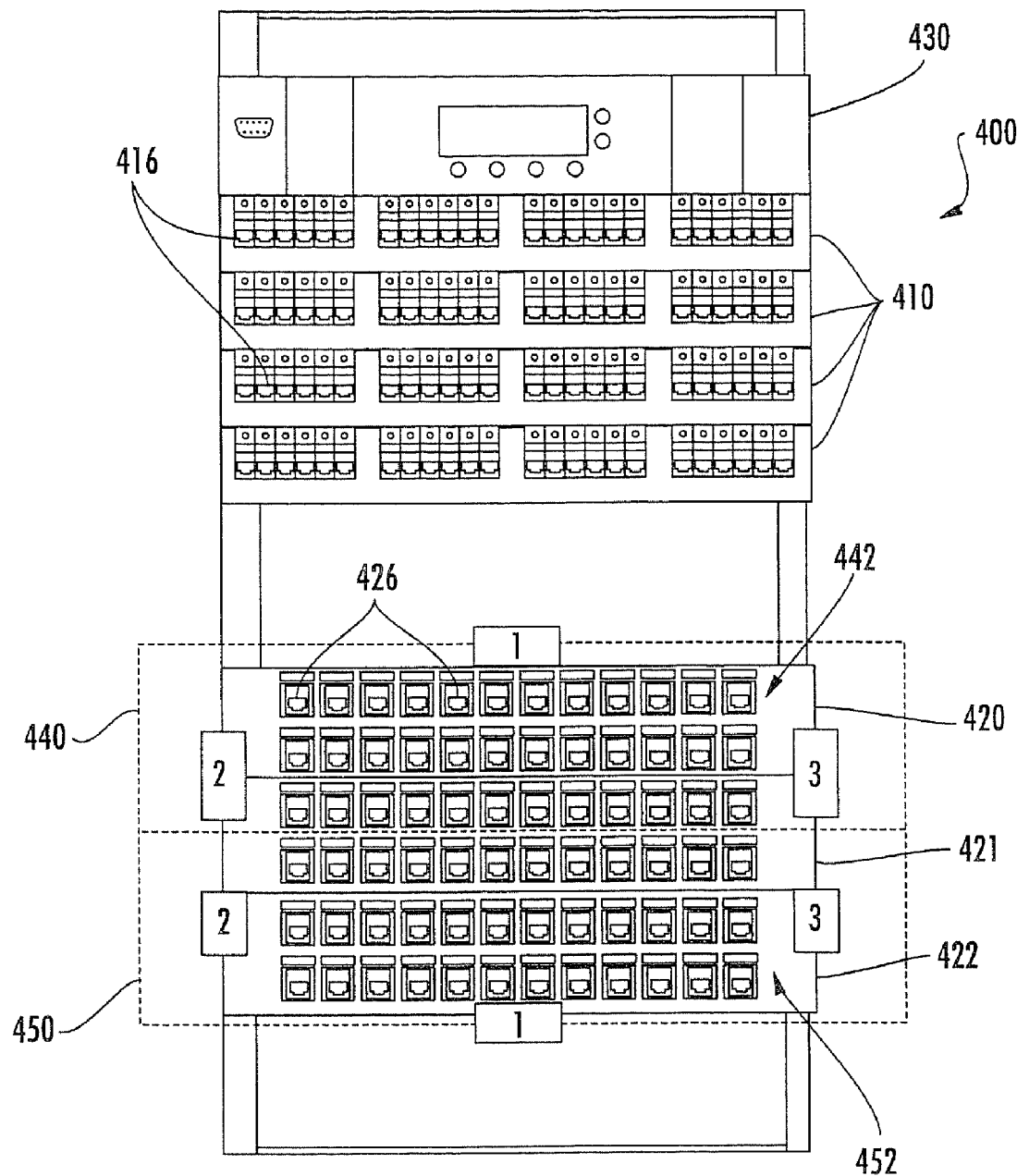
FIG. 8 is a front view of a communications patching system according to embodiments of the present invention.

FIG. 8 is a schematic front view of a communications patching system 400 according to embodiments of the present invention. The communications patching system 400 includes a plurality of RFID-enabled intelligent patch panels 410, a plurality of network switches 420-422, a rack controller 430, and two RFID triangulation systems 440, 450. The back ends of the connector ports 416 on the RFID-enabled intelligent patch panels 410 may be connected to backbone horizontal cabling (not shown in FIG. 8) in the same manner that the connectors ports 116 of the patch panels 112 of FIG. 2 are connected to the backbone horizontal cables 120. The network switches 420-422 may be connected to network routers and other network equipment (not shown in FIG. 8) in the same manner that the switches 152 of FIG. 2 are connected to the network devices 154 of FIG. 2. A plurality of patch cords (not shown in FIG. 8) may be used to connect the connector ports 416 on the RFID-enabled intelligent patch panels 410 to respective of the connector ports 426 on the network switches 420-422 in the same manner that the patch cords 160 of FIG. 2 are used to interconnect the connector ports 116 on patch panels 112 to respective of the connector ports 153 on the switches 152.

In the communications patching system 400 of FIG. 8, the RFID triangulation system 440 may be used to determine the specific patch cords (by, for example, the unique identifier contained in each of the RFID tags embedded in the connectors of the patch cord) that are plugged into the connector ports 426 on network switch 420 and on the top row of connector ports 426 on network switch 421 (together these connector ports comprise a first detection zone 442). Likewise, the REID triangulation system 450 may be used to determine the specific patch cords that are plugged into the connector ports 426 on network switch 422 and on the bottom row of connector ports 426 on network switch 421 (together these connector ports comprise a second detection zone 452). The triangulation systems 440 and 450 may operate, for example, in the same manner that the triangulation system 300 operates as described above. Additionally, the RFID-enabled intelligent patch panels 410 may operate in the same manner described above that the intelligent patch panel 200 operates in order to automatically determine the patch cord connectivity for each of the patch panels 410 (i.e., for each connector port 416, the unique identifier of any intelligent patch cord that is plugged into the connector port is determined). When this information is combined, the complete patch cord connectivity between the intelligent patch panels 410 and the network switches 420-422 may be determined. Moreover, when this information is further combined with information regarding (1) the connections between the switches 420-422 and the other network equipment and (2) the connections between the back ends of the connector ports 416 and the backbone horizontal cabling (which information may be stored, for example, in a system manager), the communications system 400 may be used to automatically determine and track complete end-to-end connectivity.

There generally is no limit to the number of detection zones that may be defined within a given equipment rack, wiring closet or patching zone. The actual number of detection zones implemented may be chosen, for example, based on the range of the antennas used to implement each detection zone and/or the number of connector ports in the equipment that is to be monitored. Because there may be RFID signal spillover between RFID readers in adjacent detection zones and/or between stand alone RFID readers and nearby intelligent patch panels, in some embodiments only one detection zone within a patching field would be searched at any given time.

Figure 9:
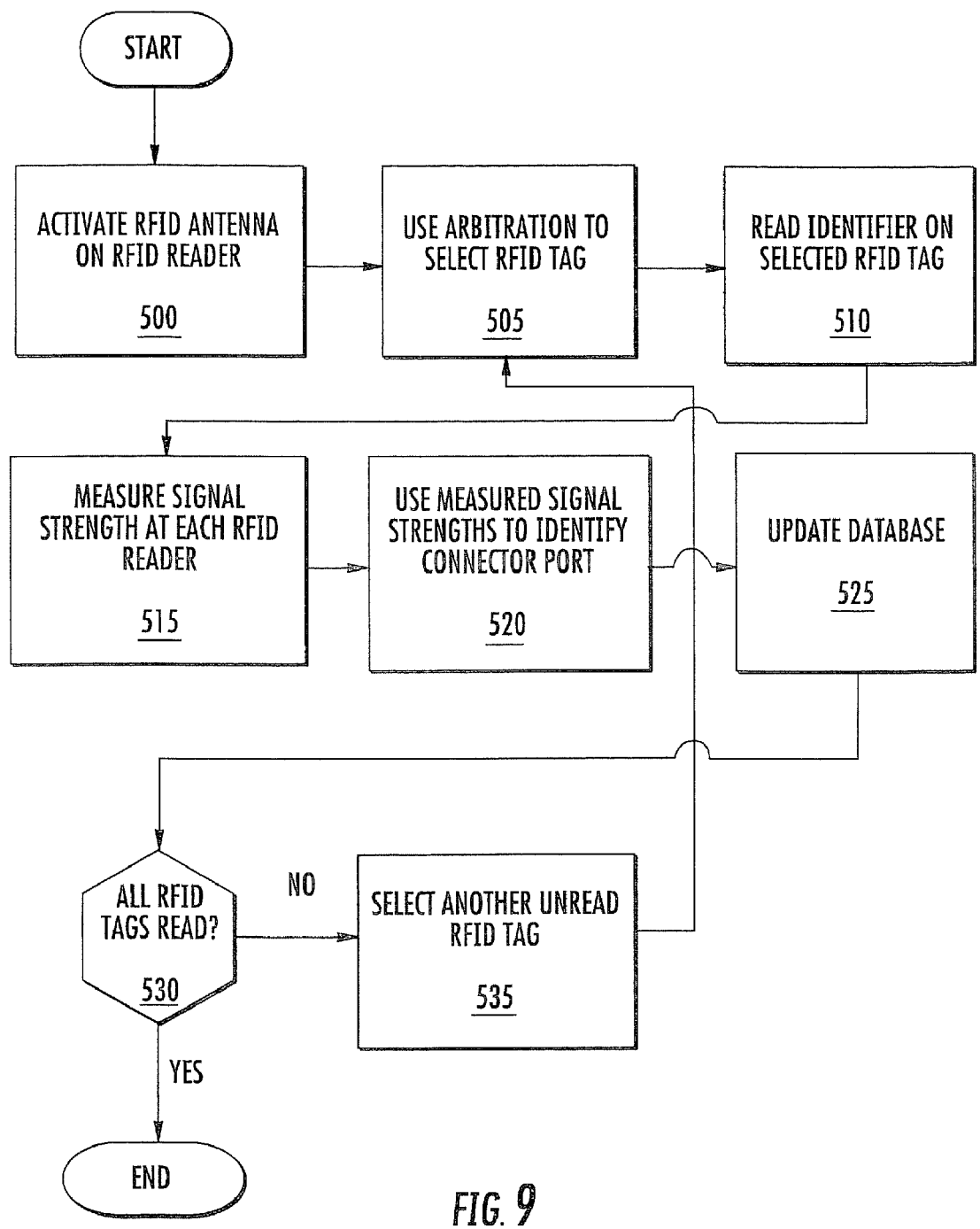
FIG. 9 is a flow chart of methods of determining patch cord connectivity information according to some embodiments of the present invention.

FIG. 9 is a flow chart of methods of determining patch cord connectivity information using a triangulation system according to some embodiments of the present invention. The triangulation system may include a plurality of RFID readers that are dispersed about the periphery of a connector port array. As shown in FIG. 9, operations may begin with the activation of the RFID antenna on a first of the RFID readers (block 500). The field emitted by this RFID antenna may be used to excite the RFID tag on each RFID-tagged patch cord that is plugged into a connector port within the connector port array. As discussed in greater detail above, an arbitration procedure may then be used to select a first of the RFID tags (block 505). Once the arbitration procedure has been used so that a single RFID tag is emitting information, each RFID reader may read the unique identifier that is stored in the RFID tag (block 510). Each RFID reader also measures the received signal strength of the signal emitted from the RFID tag (block 515).

Next, triangulation techniques may be applied to the signal strengths measured at each RFID reader to identify the specific connector port that the patch cord that includes the emitting RFID tag is plugged into (block 520). Once this connector port is identified, a database of connectivity information may be updated to include the connector port and the unique identifier of the emitting RFID tag (block 525). A determination may be then be made as to whether all of the RFID tags that were excited by the RFID antenna in the operation of block 500 have been read (block 530). If so, operations may end. If not, the arbitration procedures are used to select an unread one of the remaining RFID tags, and then operations may continue as described above starting at block 505 with respect to the unread RFID tag (block 535).

Figure 10:
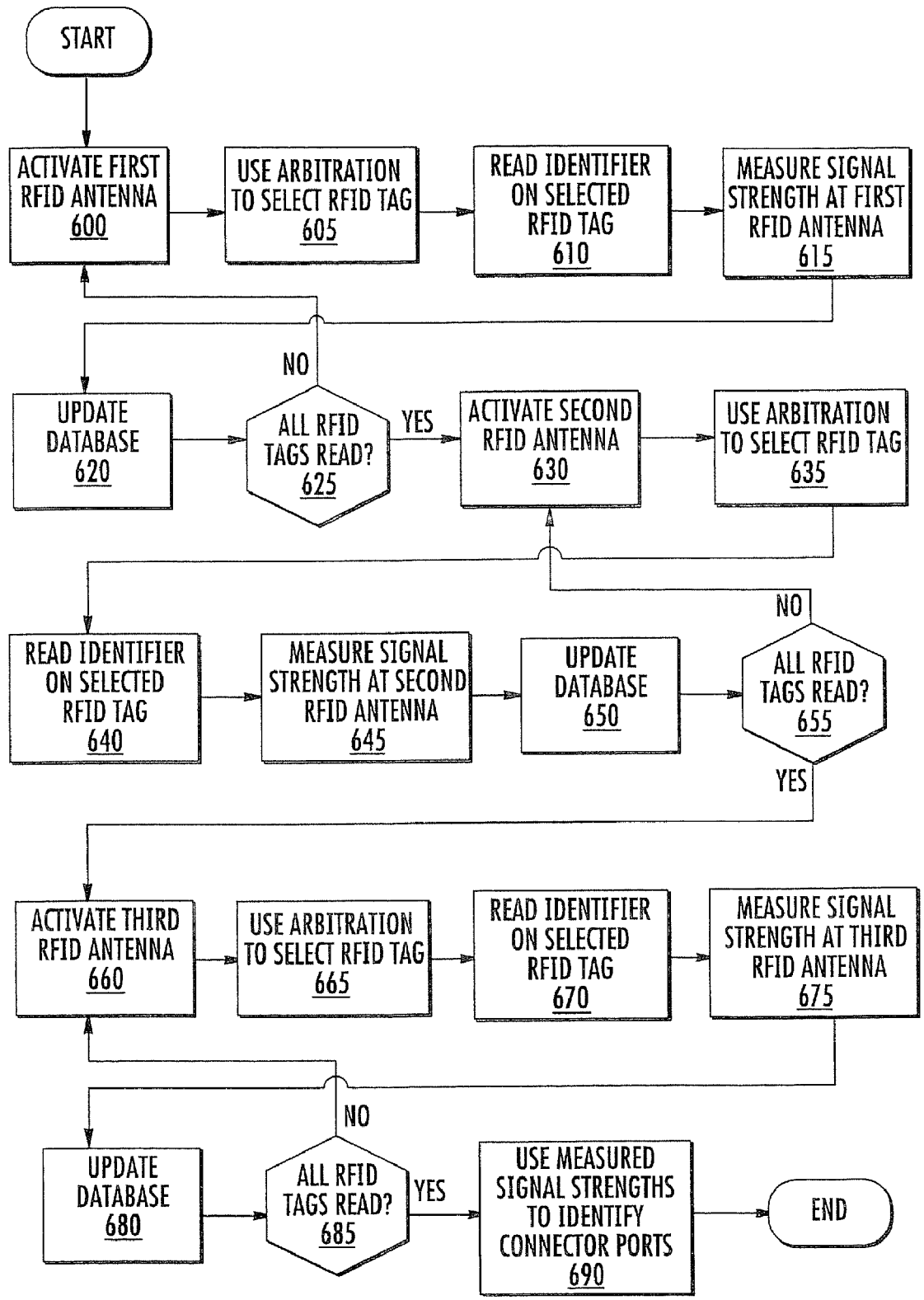
FIG. 10 is a flow chart of methods of determining patch cord connectivity information according to further embodiments of the present invention.

FIG. 10 is a flow chart of methods of determining patch cord connectivity information using a triangulation system according to further embodiments of the present invention. The triangulation system may include a plurality of RFID antennas that are dispersed about the periphery of a connector port array. The RFID antennas are connected to one or more RFID readers. As shown in FIG. 10, operations may begin with the activation of a first of the RFID antennas (block 600). The field emitted by this first RFID antenna may be used to excite the RFID tag on each RFID-tagged patch cord that is plugged into a connector port within the connector port array. As discussed in greater detail above, an arbitration procedure may then be used to select a first of the RFID tags (block 605). Once the arbitration procedure has been used so that a single RFID tag is transmitting, the RFID reader may read from the signal received at the first RFID antenna the unique identifier that is stored in the selected RFID tag (block 610). The strength of the received signal at the first RFID antenna is also measured (block 615). The unique identifier associated with the selected RFID tag and the measured signal strength may then be stored in, for example, a database (block 620).

A determination may be then be made as to whether all of the RFID tags within the connector port array have been read by the first RFID antenna (block 625). If not, operations start again at block 600 and a previously un-read RFID tag is selected via the arbitration process at block 605. Operations then continue as described above with respect to this next RFID tag for blocks 610 through 625. This process continues until all of the RFID tags in the array have been selected and their unique identifiers and measured signal strengths at the first RFID antenna have been determined.

Once this has occurred, operations continue at block 630 where the same process is performed by the second RFID antenna. In particular, at block 630, the second RFID antenna is activated, and arbitration is again used to select an RFID tag (block 635). The second RFID reader may read from the received signal the unique identifier that is stored in the selected RFID tag (block 640), and the strength of the received signal at the second RFID antenna is also measured (block 645). The unique identifier associated with the selected RFID tag and the measured signal strength may then be stored (block 650). A determination may be then be made as to whether all of the RFID tags within the connector port array have been read by the second RFID antenna (block 655). If not, operations return to block 630 and a previously un-read RFID tag is selected via the arbitration process at block 635. Operations then continue as described above with respect to this next RFID tag for blocks 630 through 655 until all of the RFID tags in the array have been selected and their unique identifiers and measured signal strengths at the second RFID antenna have been determined.

Once this has occurred, operations continue at block 660 where the same process is performed by the third RFID antenna. In particular, at block 660, the third RFID antenna is activated, and arbitration is again used to select an RFID tag (block 665). The third RFID reader may read from the signal received the unique identifier that is stored in the selected RFID tag (block 670), and the strength of the received signal at the third RFID antenna is also measured (block 675). The unique identifier associated with the selected RFID tag and the measured signal strength may then be stored (block 680). A determination may be then be made as to whether all of the RFID tags within the connector port array have been read by the third REID antenna (block 685). If not, operations return to block 660 and a previously un-read RFID tag is selected via the arbitration process at block 665. Operations then continue as described above with respect to this next RFID tag for blocks 660 through 685 until all of the REID tags in the array have been selected and their unique identifiers and measured signal strengths at the third RFID antenna have been determined.

Triangulation techniques are then applied to the signal strengths measured at each RFID antenna to identify the specific connector port that each patch cord is plugged into (block 690). A separate triangulation is performed for each RFID tag that is present in the connector port array.

While typically at least three RFID readers will be used for each detection zone in the triangulation systems according to embodiments of the present invention, it will be appreciated that in other embodiments of the present invention, fewer than three RFID readers may be used. For example, in some embodiments of the present invention, the RFID antennas may include a capability to measure not only signal strength, but also the direction of an emitting RFID tag. In such embodiments, only one or two RFID readers may be required to match a received signal from an RFID tag with a connector port in the connector port array 310. Accordingly, it will be appreciated that the present invention does not require a minimum of three RFID readers to determine patch cord connectivity information.

The RFID antennas 304 may be implemented as any of a wide variety of known RFID antennas that have an emission field that is suitable to cover the detection area. In some embodiments, each RFID antenna may be designed so that its emission field does not extend significantly beyond the detection zone in order to reduce emission spillover into other detection zones.

In various of the embodiments of the present invention described above, a single one of the RFID readers is used to excite a particular one of the RFID tags that are within the detection zone, and then each of the RFID readers read and measure the signal strength of the signal(s) emitted by the RFID tag. However, it will be appreciated that in other embodiments, each RFID reader may individually excite and read each RFID tag.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of determining patch cord connectivity information, the method comprising:
   receiving a first signal from an RFID tag that is associated with a first patch cord at a first RFID antenna;
   comparing the strength of the received first signal to pre-stored signal strength data for each of a plurality of connector ports at the first RFID antenna to identify one or more connector ports that have pre-stored signal strength data that closely matches the strength of the received first signal;
   receiving a second signal from the RFID tag at a second RFID antenna;
   comparing the strength of the received second signal to pre-stored signal strength data for each of the plurality of connector ports at the second RFID antenna to identify one or more connector ports that have pre-stored signal strength data that closely matches the strength of the received second signal;
   receiving a third signal from the RFID tag at a third RFID antenna, wherein the identification of the one of the plurality of connector ports that the first patch cord is connected to is based on the respective strengths of the received first, second and third signals
   comparing the strength of the received third signal to pre-stored signal strength data for each of the plurality of connector ports at the third RFID antenna to identify one or more connector ports that have pre-stored signal strength data that closely matches the strength of the received third signal; and identifying the one of the plurality of connector ports that the first patch cord is connected to based on the identification of the one or more connector ports that have pre-stored signal strength data that closely matches the strength of the received first signal and the identification of the one or more connector ports that have pre-stored signal strength data that closely matches the strength of the received second signal and the identification of the one or more connector ports that have pre-stored signal strength data that closely matches the strength of the received third signal.

2. The method of claim 1, the method further comprising transmitting an excitation signal to the RFID tag in order to cause the RFID tag to emit a transmitted signal, wherein the first, second and third signals are the received versions of the transmitted signal that are received at the first, second and third RFID antennas, respectively.

3. The method of claim 1, the method further comprising:
transmitting a first excitation signal to the RFID tag in order to cause the RFID tag to emit a first transmitted signal, wherein the first signal is a received version of the first transmitted signal that is received at the first RFID antenna;
transmitting a second excitation signal to the RFID tag in order to cause the RFID tag to emit a second transmitted signal, wherein the second signal is a received version of the second transmitted signal that is received at the second RFID antenna; and
transmitting a third excitation signal to the RFID tag in order to cause the RFID tag to emit a third transmitted signal, wherein the third signal is a received version of the third transmitted signal that is received at the third RFID antenna.

4. The method of claim 1, wherein the plurality of connector ports are within a detection zone, and wherein the first, second and third RFID antennas are arranged about at least part of a periphery of the detection zone.

5. The method of claim 4, wherein the RFID tag comprises one of a plurality of RFID tags that are within the detection zone, and wherein the method further comprises using an arbitration procedure to select one of the plurality of RFID tags as the RFID tag that emits a transmitted signal that is received at the first RFID antenna as the first signal.

6. The method of claim 1, wherein identifying the one of the plurality of connector ports that the first patch cord is connected to further comprises;
determining that none of the plurality of connector ports have pre-stored signal strength data at each of the first, second and third antennas that closely matches the respective received first, second and third signals; and
adjusting the strength of the received first, second and third signals; and
comparing the adjusted strengths of the received first, second and third signals to the pre-stored signal strength data.

7. The method of claim 1, the method further comprising performing a calibration operation prior to determining the patch cord connectivity information, the calibration operation comprising:
(a) inserting an RFID-enabled patch cord into a first of the plurality of connector ports;
(b) transmitting a signal over the first RFID antenna in order to cause an RFID tag on the RFID-enabled patch cord to emit a calibration signal that is received at each of the first, second and third RFID antennas;
(c) measuring the strength of the calibration signal received at each of the first, second and third RFID antennas;
(d) storing the measured strengths of the calibration signal at each of the first, second and third REID antennas as the pre-stored signal strength data for the first of the plurality of connector ports; and
(e) repeating (a) through (d) for each of the plurality of connector ports in order to obtain the pre-stored signal strength data for each of the plurality of connector ports.

8. A method of determining which connector port in a connector port array an RFID enabled patch cord having an RFID tag associated therewith is connected to, the method comprising:
transmitting one or more signals from an RFID tag;
receiving a first signal at a first RFID antenna, a second signal at a second RFID antenna and a third signal at a third RFID antenna, wherein each of the first, second and third signals comprise a received version of at least one of the signals transmitted by the RFID tag; and
performing triangulation by (a) comparing the strength of the received first signal to pre-stored signal strength data for each of the connector ports in the connector port array at the first RFID antenna to identify one or more connector ports that have pre-stored signal strength data that closely matches the strength of the received first signal, (b) comparing the strength of the received second signal to pre-stored signal strength data for each of the connector ports in the connector port array at the second RFID antenna to identify one or more connector ports that have pre-stored signal strength data that closely matches the strength of the received second signal, and (c) comparing the strength of the received third signal to pre-stored signal strength data for each of the connector ports in the connector port array at the third RFID antenna to identify one or more connector ports that have pre-stored signal strength data that closely matches the strength of the received third signal in order to identify a connector port in the connector port array that the RFID enabled patch cord associated with the RFID tag is connected to.

9. The method of claim 8, wherein the first, second and third signals each comprise a received version of the same signal that is transmitted by the RFID tag.

10. The method of claim 8, wherein the first, second and third signals each comprise a received version of a different one of signals that are transmitted by the RFID tag.

11. A system for identifying which one of a plurality of connector ports a first patch cord is connected to, comprising:
a first RFID antenna;
a second RFID antenna;
a third RFID antenna;
one or more devices that are configured to measure the strength of signals received at the first, second and third RFID antennas;
a controller that is configured to determine the location of an RFID tag associated with the first patch cord based on comparisons of the measured strengths of the signals received at the first, second and third RFID antennas to pre-stored signal strength data for each of the plurality of connector ports at each of the first, second and third RFID antennas.

12. The system of claim 11, further comprising a database of information that includes, for each of the plurality of connector ports, an expected received signal strength at each of the first, second and third RFID antennas for an RFID tag that is connected to the respective one of the connector ports.

13. The system of claim 11, wherein the RFID tag supports an arbitration procedure.

14. The system of claim 11, wherein the controller further logs patch cord interconnections with the connector ports.

15. The system of claim 11, wherein the plurality of connector ports comprises a subset of the connector ports on a plurality of network switches that are within a first detection zone.

16. The system of claim 15, wherein the number of connector ports within the first detection zone exceeds the number of RFID antennas associated with the first detection zone.

17. The system of claim 15, wherein the system further comprises a second plurality of connector ports that are part of a second detection zone, and wherein at least one of the first, second or third RFID antennas is shared between the first detection zone and the second detection zone.

18. The method of claim 1, the method further comprising performing a calibration operation prior to determining the patch cord connectivity information, the calibration operation comprising:
 (a) inserting an RFID-enabled patch cord into a first of the plurality of connector ports;
 (b) transmitting a first signal over the first RFID antenna in order to cause an RFID tag on the RFID-enabled patch cord to emit a first calibration signal that is received at the first RFID antenna;
 (c) measuring the strength of the first calibration signal received at the first RFID antenna;
 (d) transmitting a second signal over the second RFID antenna in order to cause the RFID tag on the RFID-enabled patch cord to emit a second calibration signal that is received at the second RFID antenna;
 (e) measuring the strength of the second calibration signal received at the second RFID antenna;
 (f) transmitting a third signal over the third RFID antenna in order to cause the RFID tag on the RFID-enabled patch cord to emit a third calibration signal that is received at the third RFID antenna;
 (g) measuring the strength of the third calibration signal received at the third RFID antenna;
 (h) storing the measured strengths of the first, second and third calibration signals as the pre-stored signal strength data for the first of the plurality of connector ports; and
 (i) repeating (a) through (h) for each of the plurality of connector ports in order to obtain the pre-stored signal strength data for each of the plurality of connector ports.

\* \* \* \* \*